US006246979B1

(12) United States Patent
Carl (10) Patent No.: US 6,246,979 B1
(45) Date of Patent: Jun. 12, 2001

(54) METHOD FOR VOICE SIGNAL CODING AND/OR DECODING BY MEANS OF A LONG TERM PREDICTION AND A MULTIPULSE EXCITATION SIGNAL

(75) Inventor: Holger Carl, Fuerth (DE)

(73) Assignee: Grundig AG, Fuerth (DE)

(*) Notice: Subject to any disclaimer, the term of this patent is extended or adjusted under 35 U.S.C. 154(b) by 0 days.

(21) Appl. No.: 09/446,613

(22) PCT Filed: Jul. 4, 1998

(86) PCT No.: PCT/EP98/04144

§ 371 Date: Mar. 23, 2000

§ 102(e) Date: Mar. 23, 2000

(87) PCT Pub. No.: WO99/03094

PCT Pub. Date: Jan. 21, 1999

(30) Foreign Application Priority Data

Jul. 10, 1997 (DE) ............................................... 197 29 494

(51) Int. Cl.$^7$ .............................. G01L 19/08; G01L 19/10
(52) U.S. Cl. ........................................... 704/219; 704/222
(58) Field of Search ..................................... 704/212, 216, 704/217, 218, 219, 222, 223, 230, 221

(56) References Cited

U.S. PATENT DOCUMENTS

| Re. 36,646 | * | 4/2000 | Akamine et al. ..................... 704/223 |
| 4,133,976 | | 1/1979 | Atal . |
| 4,991,215 | | 2/1991 | Tetsu . |
| 5,327,520 | | 7/1994 | Juin-Hwey . |
| 5,485,581 | * | 1/1996 | Miyano et al. ....................... 704/223 |
| 5,596,676 | | 1/1997 | Kumar . |
| 5,933,803 | * | 8/1999 | Ojala ..................................... 704/223 |
| 6,052,661 | * | 4/2000 | Yamaura et al. ..................... 704/222 |

FOREIGN PATENT DOCUMENTS

| 0 578 436 | 1/1994 | (EP) . |
| 0 657 874 | 6/1995 | (EP) . |
| 4-077800 | * 3/1992 | (JP) ................................. G10L/9/18 |

OTHER PUBLICATIONS

Ikedo J Et Al: "Low Complexity Speech Coder for Personal Multimedia Communication" 1995 Fourth IEEE International Conference on Universal Personal Communications Record, Gateway to the 21$^{21}$. Century Tokyo, Nov. 6–10, 1995, No. Conf. 4, Nov. 6, 1995, pp. 808–812, XP000690063 Institute of Electrical and Electronics Engineers see paragraph IV.A.

Fuldseth A Et Al: "Pitch Prediction in a Wideband CELP Coder" Signal Processing Theories and Applications, Brussels, Aug. 24–27, 1992, vol. 1, No. Conf. 6, Aug. 24, 1992, pp. 499–502, XP000348709 Vandewalle J; Boite R; Moonen M; Oosterlinck A see paragraph 3, see paragraph 4.

Berouti M Et Al: "Efficient computation and encoding of the multipulse excitation for LPC" ICASSP 84. Proceedings of the IEEE International Conference on Acoustics, Speech and Signal Processing, San Diego, CA, USA, Mar. 19–21, 1984, pp. 10.1/1–4 vol. 1, XP002083781 1984, New York, NY, USA, IEEE, USA see paragraph 2.1, see paragraph 3.

* cited by examiner

Primary Examiner—William R. Korzuch
Assistant Examiner—Abul K. Azad
(74) Attorney, Agent, or Firm—Paul Vincent

(57) ABSTRACT

This invention relates to a method for voice signal coding and/or decoding. According to this method, a voice signal analysis for determining the prediction parameters is carried out from a digital voice signal. An excitation signal component (ENtp) is determined from an adaptive code book (3) built from a delayed integral excitation signal (Ev). Further, a multipulse component of the excitation signal is determined (4) by minimising the effect of the weighting filtered difference between the signal resulting from the respective excitation signal and the input voice signal.

27 Claims, 4 Drawing Sheets

METHOD FOR VOICE SIGNAL CODING AND/OR DECODING BY MEANS OF A LONG TERM PREDICTION AND A MULTIPULSE EXCITATION SIGNAL

BACKGROUND OF THE INVENTION

The invention concerns a method for encoding and/or decoding voice signals, in particular for digital dictating devices.

For encoding, a voice signal is usually initially low-pass filtered at a limiting frequency of less than 4 kHz and the resulting signal is sampled at a sampling rate of 8 kHz. The sampled signal is converted into a digital voice signal consisting of a sequence of voice signal sampling values. Prediction parameters are determined from this sequence of voice signal sampling values for use in the voice signal encoder and decoder. Moreover, for each voice signal sampling value a predicted value is calculated using the above-mentioned prediction parameters for each of the voice signal sampling values. The difference between each signal sampling value and its predicted value is quantized, digitally encoded and passed, modulated together with the prediction parameters, to a storage medium which may be e.g. a magnetic tape or a RAM memory. The signal stored by the storage medium is divided into its individual partial signals and used in a voice decoder to reproduce the original voice signal as precisely as possible.

Conventional methods operating according to the above-mentioned basic principles are disclosed in the patent documents U.S. Pat. No. 4,133,976, U.S. Pat. No. 3,631,520 and EP-A0657874 describes a voice signal encoder which calculates prediction parameters from a digitized voice signal. An adaptive code book is used to determine an excitation signal component. In addition, multiple pulse components of the excitation signal are determined using the voice signal. For processing, the voice signals are divided into varions time regions and subjected to individual further processing.

U.S. Pat. No. 5,327,520 discloses a voice encoder with which, using a backward adaptive AGC, stored code vectors are evaluated for comparison to input voice signals. For simplification, they are administered in tables.

The publication "Low Complexity Speed Coder for Personal Multimedia Communication", J. Ikedo et al., 1995 fourth IEEE International Conference on Universal Personal Communications Record, Gateway to the $21^{st}$ Century, Tokyo 06 to Nov. 10, 1995, describes an adaptive code book having entries from a delayed overall excitation signal. In this code book, each inital subblock is completely examined. Only a defined partial region is searched in each of the additional subblocks.

The publication "Efficient Computation and Encoding of the Multipulse Excitation for LPC", M. Berouti et al., ICASSP $84^{th}$ Procedings of the IEEE International Conference on Acoustics, Speech, and signal Processing, San Diego, USA, Mar. 23–25, 1984, pages 10.1/1–4, describes a coding procedure with which multipulse excitation vectors are encoded using their pulse positions and associated amplitudes.

Departing from this prior art, the underlying purpose of the invention is to improve the quality of reproduction of a voice signal recorded with a digital dictating device.

SUMMARY OF THE INVENTION

This object is achieved on the basis of the features of the independent claims. The dependent claims describe advantageous embodiments and further developments.

Advantageously and in accordance with the invention, the method operates without interblock encoding to enable editing functions such as recording insertion or deletion of parts of the recorded signals, Although the claimed method is optimized with respect to recording and reproduction of voice signals, other signals can also be recorded and reproduced with satisfactory quality such as music or any sounds, mixtures of voices, vehicle noises etc.

The features of the invention are explained below using an exemplar y embodiment. The embodiment does not represent an exhaustive enumeration of all possible embodiments in accordance with the invention but has exemplary character only. The features in the claims may be utilized either individually or collectively in any arbitrary combination.

The method is carried out as follows:

After pre-processing, a digital voice signal is further processed in blocks. The pre-processed digital voice signal s is initially subjected to an LPC analysis (LPs=linear predictive encoding), wherein LPC parameters a are determined from the digital voice signal. These are used in an inverse filtration for generating an LPC residual signal r from the digital voice signal t. On the basis of the LPC parameters a and the LPC residual signal r, an LTP analysis, a so-called longterm prediction analysis is effected and pulse parameter generation carried out. In alternative embodiments, the voice signal can be supplied to the LTP analysis and/or the pulse parameter generation, either unfiltered or filtered using another filtration and not the above-mentioned inverse filtration.

In addition to the residual signal r and the LPC, parameters a, the total excitation signal $e_v$, delayed by a subblock, is supplied to the DuP analysis and the pulse parameter generation. The LTP analysis generates parameters which define an excitation vector $e_{itp}$, and the pulse generation produces parameters determining the excitation vector $e_{mpe}$.

The excitation vectors $e_{mpe}$ and $e_{itp}$ are generated and added together to obtain the total excitation signal e. This total excitation signal e is subsequently delayed by a subblock to obtain the total excitation signal $e_v$ delayed by a subblock.

The input signal is a digital voice signal with a sampling rate of 12 kHz, This signal is, initially, high-pass filtered, the high-pass having a (lower) limiting frequency of 50 Hz. This eliminates D.C. and low-frequency components from the digital voice signal which might have otherwise disturbed the subsequent analysis. The transfer function of the high-pass filter is $$H(z) = \frac{z-1}{z-0.99}.$$

Furthermore, the digital signal is subjected to a pre-emphasis using an FIR filter of first order having a transfer function $$E(z)=z-0.1$$

This pre-emphasis causes a slight level increase of approximately 1 to 1.5 dB.

The next step involves the formation of blocks. During block formation, the signals are segmented into superimposed analysis blocks of 324 sampling values, i.e. each having a duration of 27 ms. Neighboring blocks overlap with a duration of 3ms. Each of the 24 ms long synthesis blocks, centered in the analysis blocks, consists of four 6 ms subblocks, wherein the LTP analysis described below and the pulse parameter generation are carried out for each subblock, i.e. four times per block.

The LPC analysis may be carried out e.g. as described below. Each analysis block is initially subjected to trapezoidal window formation. The window is defined as follows:

$$w(n) = \begin{cases} \frac{n+1}{14} & 0 \le n < 14 \\ 1 & 14 \le n < 310 \\ \frac{324-n}{14} & 310 \le n < 324. \end{cases}$$

The subsequent step calculates an auto-correlation sequence according to the following equation:

$$\varphi_{xx}(n) = \sum_{i=0}^{323-n} s_w(i) \cdot s_w(i+n) \ (0 \le n \le 14),$$

wherein $s_w(n)$ represents a windowed input segment. The first value $\varphi_{xx}(0)$ of the auto-correlation sequence is subsequently increased through multiplication with a factor of 1.0004, to make the subsequent calculations numerically more favorable.

From the resulting auto-correlation sequence, the LPC prediction parameters are calculated by solving the linear system of equations $$\begin{bmatrix} \varphi_{xx}(0) & \varphi_{xx}(1) & \ldots & \varphi_{xx}(13) \\ \varphi_{xx}(1) & \varphi_{xx}(0) & \ldots & \varphi_{xx}(12) \\ \ldots & \ldots & \ldots & \ldots \\ \varphi_{xx}(13) & \varphi_{xx}(12) & \ldots & \varphi_{xx}(0) \end{bmatrix} \cdot \begin{bmatrix} a_1'' \\ a_2'' \\ \ldots \\ a_{14}'' \end{bmatrix} = - \begin{bmatrix} \varphi_{xx}(1) \\ \varphi_{xx}(2) \\ \ldots \\ \varphi_{xx}(14) \end{bmatrix}$$

e.g. by means of the Durbin-Levinson recursion algorithm and by setting $a_0''$ 1.

These LPC prediction parameters are subjected to bandwidth broadening by 20 Hz, wherein the relation $$a_i' = a_i'' \gamma_{bwe}{}^i (0 \le i \le 14)$$

with $$\gamma_{bwe} = e^{-\pi \frac{20 \text{ Hz}}{12000 \text{ Hz}}}$$

is applied to the LPC parameters. This bandwidth broadening broadens the formants in the LPC spectrum such that reproduction of the decoded voice signal is acoustically softer and more pleasant.

The pre-processing described above provides efficient determination of LPC parameters allowing effective signal compression. Further signal processing causes improved quantization of the LPC parameters and results in more realistic reproduction of the voice signal.

In the next step, the modified LPC prediction parameters are converted to reflection coefficients. This is achieved according to the following recursion relation:

$$k_{14}' = a_{14}'^{(14)}$$

$$\text{for } m = 14, \ldots, 2: \ a_i'^{(m-1)} = \frac{a_i'^{(m)} + k_m' a_{m-i}'^{(m)}}{1 - k_m'^2} \ (1 \le i \le m-1),$$

$$k_{m-1}' = a_{m-1}'^{(m-1)}$$

Finally, the reflection coefficients are quantized using 14 scalar quantizers with a total of 52 bits, wherein for the coefficients $k_0'$ to $k_{13}'$ 5,5,4,4,4,4,4,4,3,3,3,3,3 and 3 bits are used. Quantization is effected using stored tables containing values for the reflection coefficients, wherein quantization may be effected e.g. by simple minimization of the Euclidean distance. This quantization leads to a set of 14 quantized reflection coefficients $k_i$ with $0 \le i \le 13$.

After this quantization, the LPC parameters are calculated according to the following recursion formula:

$$a_0^{(1)} = 1 \quad (0 \le l \le 14);$$

$$\text{for } m = 1, \ldots, 14: \ a_i^{(m)} = a_i^{(m-1)} + k_m a_{m-i}^{(m-1)} \ (1 \le i \le m-1),$$

$$a_m^{(m)} = k_m$$

The LPC parameters a are a result of the LPC analysis and are used as input values for the LTP analysis and pulse parameter generation. Scalar quantization calculates the coefficients $\tilde{a}$, which represent the relative addresses in the respective reflection coefficient memory. These memory addresses $\tilde{a}$ are stored together with the other enncoded values and used on the reproduction-side in voice decoding for regenerating the voice signal. A total of 14 LPC parameters a or 14 addresses a is determined for each block.

The LTP analysis is carried out as follows:

In addition to the LPC parameters a determined by the LPC analysis, an LPC residual signal r(n) ($0 \le n \le 71$) as well as the delayed total excitation signal $e_v$ are supplied to the LTP analysis as input signals. Each LPC residual signal r(n) is assigned to a subblock and is determined by passing the digital voice signal s through the LPC inversion filter $$A(z) = \sum_{i=0}^{14} a_i \cdot z^{-i}$$

The LPC parameters a determined by the LPC analysis are also inversion filtered.

The LPC parameters a are weighted with a weighting factor $\gamma_{ltp}=0.7$:

$$a_i^{(ltp)} = a_i \cdot \gamma_{ltp}{}^i \ (0 \le i 14)$$

The LPC parameters weighted in this fashion are used to calculate the first 36 sampling values of the pulse response $$h^{(ltp)}(n) \ (0 \leq n \leq 35)$$

of the filter $$\frac{1}{\sum_{i=0}^{14} a_i^{(ltp)} z^{-i}} = \frac{1}{A\left(\frac{z}{\gamma_{ltp}}\right)}$$

The weighted LPC parameters $a_i^{(ltp)}$ and the pulse response $h^{(ltp)}(n)$ are calculated once per block, whereas the further calculations are carried out individually for each subblock.

A weighted input signal $$x_{ltp}(n) \ (0 \leq n \leq 71)$$

is determined from the residual LPC signal r(n) using the filter $$\frac{1}{A\left(\frac{z}{\gamma_{ltp}}\right)}$$

The target vector for a search in the adaptive code book $$t_{ltp}(n) \ (0 \leq n \leq 71)$$

is obtained by subtracting a signal $$y_{ltp}(n) \ (0 \leq n \leq 71)$$

from the signal $x_{ltp}(n)$. The signal $y_{ltp}(n)$ is likewise obtained using a filter having the transfer function $$\frac{1}{A\left(\frac{z}{\gamma_{ltp}}\right)}$$

to which a zero signal is added and the weighted LPC parameters $a_{ltp}$ are supplied. The filter status values have to be set, before each subblock filtration, to the values that a filter $$\frac{1}{A\left(\frac{z}{\gamma_{ltp}}\right)}$$

subjected to the total excitation signal e had at the end of the respectively preceding subblock.

The search in the adaptive code book extends over code words having a sampling value length of 72 sampling values each, which are formed from the preceding 186 total excitation signal sampling values e(n), with $-186 \leq n \leq -1$, according to the following scheme.

$$c_m(n) = e(-\lambda m + n) \ (0 \leq n \leq 71)$$

wherein:

$$36 \leq m_{min} \leq m \leq m_{max} \leq 186, \lambda = \begin{cases} 1 & \text{for } m > n \\ 2 & \text{for } m \leq n. \end{cases}$$

The search in the adaptive code book considers integral delays m only. The search in the adaptive code book is carried out over the entire range of 151 delays only in the first subblock of each block. A reduced range of only 48 delays is searched in the subsequent subblocks of each block. This range depends on the delay determined in the previous subblock and is determined by the following equation $$m_{min} = \begin{cases} 36 & \text{in-subblock} - 1 \\ MAX(59, M_{prev}) - 23 & \text{in-subblock} - 2, 3, \text{and } 4, \end{cases}$$

$$m_{max} = \begin{cases} 186 & \text{in-subblock} - 1 \\ MIN(162, M_{prev}) + 24 & \text{in-subblock} - 2, 3, \text{and } 4. \end{cases}$$

Wherein $M_{prev}$ is the delay resulting from the LTP analysis of the respective preceding subblock.

Selection of the best delay M is carried out by determination of $$C_M = \underset{m_{min} \leq m \leq m_{max}}{MAX}\left(C_m = \frac{cross(m)}{\sqrt{energy(m)}}\right).$$

Wherein:

$$cross(m) = \sum_{n=0}^{71} t_{lpc}(n) \cdot f_m(n) \text{ and } energy(m) = \sum_{n=0}^{71} f_m(n)^2,$$

with $f_m(n)$ being the response of the FIR filter defined by the pulse response $h^{(ltp)}(n)$ to the code word $c_m(n)$, assuming that the status memories of this filter are deleted.

After determination of the optimum delay M the associated optimum amplification factor is calculated according to the equation $$\beta' = \frac{cross(M)}{energy(M)}.$$

This amplification factor is subsequently quantized with a 5 bit linear quantizer e.g. using a stored table. The resulting quantized amplification factor β is used to calculate the component of the excitation vector extracted with the adaptive code book for the present subblock according to the following equation:

$$e_{ltp}(n) = \beta \cdot c_m(n) \ (0 \leq n < 71)$$

The delays obtained in the four subblocks are encoded using a total of 24 bits as follows: Assuming that $M_s$ is the delay of the subblock s ($1 \leq s \leq 4$) the 24 bit delay code is calculated according to the following equation:

liagscode={{$(M_4-m_{min}(4))48+(M_3-m_{min}(3))$}$48+(M_2-m_{min}(2))$}$151+(M_1-36)$ with $m_{min}(s)$ characterizing the lower limit of the searched range for the delay in subblock s.

According to the described method, a signal $e_{ltp}(n)$ is determined through the LTP analysis for each subblock which represents the component of the excitation vector for the present subblock extracted with the adaptive code book. Furthermore, for each block a delay code lagscode and 4 quantizing indices β are determined for the amplification factors each of which corresponds to an address in an associated table memory which stores values for the amplification factors β. These coefficients lagscode and β are recorded together with the other encoded values and used on the reproduction side for voice decoding to regenerate the voice signal.

The pulse parameter generation will be described in more detail below.

In addition to the LPC parameters a determined in the LPC analysis, pulse parameter generation utilizes the LPC residual signal r(n), the delayed total excitation signal $e$,, as well as the total excitation signal component $e_{ltp}$ determined in the LTP analysis.

The LPC parameters a are weighted with a weighting factor $\gamma_{mpe}=0.9$:

$$a_i^{(mpe)} = a_i \cdot \gamma_{mpe}^i \quad (0 \leq i \leq 14)$$

The LPC parameters weighted in this fashion are used to calculate the first 42 sampling values of the pulse response $$h^{(mpe)}(n) \quad (0 \leq n \leq 41)$$

of the filter $$\frac{1}{\sum_{i=0}^{14} a_i^{(mpe)} z^{-i}} = \frac{1}{A\left(\frac{z}{\gamma_{mpe}}\right)}.$$

As is the case in the LTP analysis, calculation of the weighted LPC parameters $a_i^{(mpe)}$ and of the pulse response $h^{(mpe)}(n)$ is thereby performed once per block. An auto-correlation sequence is also determined from the pulse response $h_{(mpe)}(n)$ according to the following equation:

$$hh^{(mpe)}(n) = \begin{cases} \sum_{i=0}^{42-n} h^{(mpe)}(i) \cdot h^{(mpe)}(i+n) & 0 \leq n < 42 \\ 0 & 42 \leq n < 72. \end{cases}$$

Further calculations are carried out individually for each subblock.

Calculation of a target vector $$t_{mpe}(n) = x_{mpe}(n) - y_{mpe}(n) \quad (0 \leq n \leq 71)$$

is carried out in principle by using the same calculation scheme used for calculation of the target vector $t_{ltp}$ in the LTP analysis. A weighted version $x_{mpe}(n)$ of the input signal is also generated by filtration of the LPC residual signal with $$\frac{1}{A\left(\frac{z}{\gamma_{mpe}}\right)}$$

Moreover, a signal $y_{mpe}(n)$ is obtained by filtering (but not with a zero signal) the excitation signal component from the adaptive code book $e_{ltp}$ with a filter $$\frac{1}{A\left(\frac{z}{\gamma_{mpe}}\right)}$$

whose status values are set, before each subblock filtration, to the values of a filter, $$\frac{1}{A\left(\frac{z}{\gamma_{mpe}}\right)}$$

acting on the total excitation signal e, at the end of the preceding subblock.

Determination of the pulse parameters is performed by using the pulse response $h^{(mpe)}(n)$, the auto-correlation sequence $hh^{(mpe)}(n)$ and the target vector $t_{mpe}(n)$. These pulse parameters designate those 7 positions in the respective subblock where excitation pulses must be present and furthermore comprise information concerning the pulse amplitudes.

In this connection, a vector th(n) is initially determined according to the following equation:

$$th(n) = \sum_{i=n}^{MIN(71,n+42)} t_{mpe}(i+n) \cdot h^{(mpe)}(i) \quad (0 \leq n \leq 71).$$

The first pulse position is then given by $$p_1 = N \text{ with } |th(N)| = \MAX_{0 \leq n \leq 71}(|th(n)|).$$

The defined th value is then stored in $$d_0 = th(N)$$

the first element of a vector variable of length 7. The second pulse position is then determined as follows:

$$m_{n,0} = \frac{hh^{(mpe)}(|n-N|)}{hh^{(mpe)}(0)} \quad (0 \leq n \leq 71)$$

$$th(n) = th(n) - m_{n,0} \cdot d_0 \quad (0 \leq n \leq 71)$$

$$p_2 = N \text{ with } |th(N)| = \MAX_{n \in \{0,\ldots,p_1-1\} \cup \{p_1+1,\ldots,71\}}(|th(n)|)$$

$$d_1 - th(N)$$

with $m_{\mu, \nu}$ being a 72×6 matrix variable.

The residual five pulse positions are then determined in a loop $$j = 1$$

$$as - long - as \ j < 6;$$

$$m_{n,j} = \frac{hh^{(mpe)}(|n-N|)}{hh^{(mpe)}(0)} - \sum_{i=0}^{j-1} m_{n,i} \cdot m_{N,i} \quad (0 \leq n \leq 71)$$

$$th(n) = th(n) - m_{n,j} \cdot d_j$$

-continued $$p_{j+2} = N \text{ with } |th(N)| = \underset{n \in \left\{n \left| \begin{array}{c} 0 \le n \le 71 \wedge \\ n \ne p_1, \ldots, p_{j+1} \end{array}\right.\right\}}{\text{MAX}} (|th(n)|)$$

$$d_{j+1} = th(N)$$

$$j = j + 1.$$

After all seven pulse positions have been determined in the described fashion, the associated pulse amplitudes $b_j (1 \le j \le 7)$ are obtained by application of the following recursion relations:

$$b_7 = \frac{d_6}{hh^{(mpe)}(0)}$$

$$j = 5$$

$$as - long - as \; j \ge 0:$$

$$b_{j+1} = \frac{d_j}{hh^{(mpe)}(0)} - \sum_{i=j+1}^{6} m_{p_i, j} \cdot b_{i+1}$$

$$j = j + 1.$$

The 7 parameter pairs $[p_j, b_j]$, the respective pulse position and the pulse amplitude determined in this fashion are newly sorted such that the values for the pulse positions of the finally obtained pulse parameter pairs [pos$_j$, amp$_j$'] are present in descending sequence, i.e.

72>pos$_1$>pos2>pos$_3$>pos$_4$>pos$_5$>pos$_6$>pos$_7 \ge 0$

This sorting is required for the subsequent position encoding leading to a position code with 31 bits calculated as a sum of binominal coefficients:

$$poscode = \sum_{i=1}^{7} \binom{pos_i}{8-i}.$$

The pulse amplitudes amp, are quantized as follows. The block maximum, the value maximum of the 7 pulse amplitudes are e.g. quantized in a non-linear manner using a stored table with 6 bits and the pulse amplitudes are then normalized to the quantized block maximum and subsequently subjected to a 3 bit linear quantization e.g. using an additional table.

The resulting unnormalized quantized pulse amplitudes amp are finally used to form a pulse excitation vector according to the following relation:

$$e_{mpe}(n) = \begin{cases} amp_j & n = pos_j (1 \le j \le 7) \\ 0 & \text{otherwise} \end{cases} (0 \le n \le 71).$$

According to the described method, the pulse parameter generation leads to formation of an excitation vector, signal $e_{mpe}(n)$, using the pulse parameters for the instantaneous subblock. Moreover, the position code poscode and the coefficients amp are generated from the amplitude quantization and consist of 8 indices, since the block maximum is quantized in addition to the 7 amplitudes. These coefficients are recorded together with the further encoded values and used at the reproduction side in the voice decoder for regenerating the voice signal. Determination of these pulse parameter coefficients poscode and amp is effected four times per block, i.e. once per subblock.

A method for voice signal decoding will be described below.

A multiplex signal comprising the transferred or recorded encoded values ã, lagscode, β, poscode and amp is used for voice signal decoding. 14 LPC parameters a are determined for each block using the coefficients ã and an associated table. Moreover, for each subblock, the further parameters M, β, pos and amp are regenerated, wherein the LTP delays for the four subblocks of a block $M_1$ to $M_4$, are determined from the 24 bit value lagscode as follows:

$$code = lagscode$$

$$aux = \left\lfloor \frac{code}{151} \right\rfloor$$

$$M_1 = (code - 151 \cdot aux) + 36$$

$$s = 2$$

$$as - long - as \; s \le 4:$$

$$code = aux$$

$$aus = \left\lfloor \frac{code}{48} \right\rfloor$$

$$M_s = (code - 48 \cdot aux) + m_{min}(s).$$

wherein $m_{min}(s)$ is the lower limit of the searched range for the delay in each of the subblocks and $\lfloor x \rfloor$ characterizes the largest integer which does not exceed x.

The LTP amplification value (of a subblock, encoded with 5 bits, is determined e.g. using a table memory.

The 7 pulse positions $pos_j (1 \le j \le 7)$ of a subblock are obtained from the 31 bit long position code poscode obtained by application of the following calculation scheme:

$$code = poscode$$

$$n = 71$$

$$j = 7$$

$$as - long - as \; j > 0:$$

$$as - long - as - code < \binom{n}{j} : n = n - 1$$

$$pos_{8-j} = n$$

$$code = code - \binom{n}{j}$$

$$j = j - 1.$$

The pulse amplitudes amp$_j$ $(1 \le j \le 7)$ of a subblock are subsequently obtained from amp by initially decoding the 6 bit encoded block maximum e.g. using an associated quantizing table and the seven normalized amplitudes are then decoded. Finally, the decoded pulse amplitudes amp are each determined as a product of the decoded block maximum and the decoded normalized amplitude.

In the next step an excitation signal is calculated from the values for M, β, pos and amp determined for each subblock. This calculation is carried out for each of the subblocks, i.e. four times per block.

The component obtained from the adaptive code book is initially calculated as follows:

$$e_{ltp}(n) = \beta \cdot c_M(n) \; (0 \le n \le 71)$$

wherein $c_M(n)$ is the entry in the adaptive code book associated with the delay M.

A pulse excitation vector $$e_{mpe}(n) = \begin{cases} amp_j & n = pos_j^{(1 \leq j \leq 7)} \\ 0 & \text{otherwise} \end{cases} \quad (0 \leq n \leq 71)$$

is then determined resulting in the excitation signal e(n)

$$e(n) = e_{ltp}(n) + e_{mpe}(n) \quad (0 \leq n \leq 71)$$

The output voice signal is obtained from the LPC synthesis filter $$\frac{1}{A(z)} = \frac{1}{\sum_{i=0}^{14} a_i \cdot z^{-i}}$$

defined by the LPC parameters a which is applied to the total excitation signal e(n).

Finally, in a post-processing step, the higher frequencies of the voice signal, raised on the recording side are lowered by a de-emphasis filter having the transfer function:

$$D(z) = \frac{z}{z - 0.1}.$$

Moreover, the subjective quality of the voice signal reconstructed in this manner can be influenced by a fixed or adaptive post-filter.

According to an advantageous embodiment of the invention, the bit rate of the above-described method is variable such that the effective, i.e. the average bit rate can be generally reduced for a lower ambient noise level. This further development provides a voice activity detector which monitors the input signal for the occurrence of speech pauses. The signal present during these speech pauses may be transmitted or stored with low quality so that, for the duration of the speech pauses, the signal can be encoded at a considerably lower bit rate than that used for the voice.

For voice activity detection, the signal energy is evaluated. The power of the input signal for the respective synthesis block is given by $$P = \frac{1}{288} \sum_{n=0}^{287} s(n)^2.$$

This power value is compared to an adaptive threshold value Thr which is determined as follows.

An estimated value $P_n$ for the noise power is increased block by block according to the relation $$P_n = 1.015625 P_n$$

as long as it is not larger than the signal energy P of the present block. If this condition is no longer met, this estimated value is reset to $$P_n = P.$$

After this update of $P_n$, possible results outside of the range of $$2^7 \leq P_n \leq 2$$

are reset to the corresponding upper or lower limit.

Initialisation of the estimated value for the noise power should be exercised up to $$P_n = 128$$

to prevent misinterpretation of low level voice signals as speech pauses during the threshold value initiation phase. To keep this threshold value initiation phase short, the minimum power $P_{min}$ of the input signal during processing of the first 50 blocks is determined. After these first 50 blocks, the estimated value for the noise power is increased—as long as no speech pause is detected—according to the relation $$P_n = 1.046875 P_n$$

if $P_{min}$ is larger than $P_n$.

A decision threshold value is calculated on the basis of this estimated value for the noise power:

$$Thr = -2^{17} P_n^2 + 5 P_n.$$

A preliminary decision is then made for the present block as to whether or not a speech pause occurred:

$$SA_0 = 1 \text{ for } P \geq Thr$$

$$SA_0 = 0 \text{ for } P < Thr$$

The final decision as to whether or not a speech pause occurred is taken according to the relation:

$$SA = SA_{-5} \vee SA_{-4} \vee SA_{-3} pullout;zu872900.900 SA_{-2} pullout;zu872900.900 SA_{-1} pullout;zu872900.900 SA_0$$

This means that the present block is classified as a block without voice signals only if the determined signal output detected in the present and in the last 5 blocks is below the threshold value.

Blocks without voice signals are modeled as spectral colored noise. In addition to a voice activity bit, which is zero in this case, the LPC coefficients and an amplification factor are stored per subblock for these blocks. The LPC analysis and encoding/decoding of the reflection coefficients is effected as for the voice signals. One less bit is used to quantize of the 14th reflection coefficient.

The output signal generated on the decoder side for the blocks without voice activity is generated as an output signal of an LPC synthesis filter determined by the LPC parameters quantized in this fashion to which an approximately white noise signal is applied. The noise signal is extracted from a pseudo noise generator which supplies random numbers u(n) evenly distributed in an amplitude range between −1 and 1 which must then be scaled with an amplification factor δ.

The encoder determines such an amplification factor once per subblock. This is effected by adjusting the excitation signal energy to a level which is 3 dB below the energy level of the LPC residual signal r(n). For simultaneous 5 bit quantization of the amplification factor the term $$\left| \frac{\delta^2}{3} - \frac{1}{144} \sum_{n=0}^{71} r(n)^2 \right|$$

is minimized over the entire supply of non-linear quantized noise amplification factors δ, using a stored table. The entire bit rate for the duration of the blocks without voice signal is then $$\frac{(1+51+20)\text{Bits}}{24 \text{ ms}} = 3.0 \text{ kbps}.$$

Encoding and decoding of the blocks having voice signals is carried out essentially as described above in connection with the constant bit rate. The following differences obtain:

Storage of a voice activity bit for each block is enabled without changing the bit rate by encoding the 14th reflection coefficient with 1 bit less than for the case of the above-described embodiment with fixed bit rate.

The voice signal encoder and the voice signal decoder must guarantee that the adaptive code book merely comprises excitation vectors derived from blocks with voice signal. This means that the noise excitation used for encoding of blocks without voice signal, is not integrated in the adaptive code book, i.e. the adaptive code book will be deactivated or frozen when blocks without voice signal are present. Moreover, within the framework of the encoder-side calculations, the filter memories of the weighting filters and of the synthesis filters have to be reset for each transition from blocks without voice signal to blocks with voice signal.

DESCRIPTION OF THE PREFERRED EMBODIMENT

Figure 1:
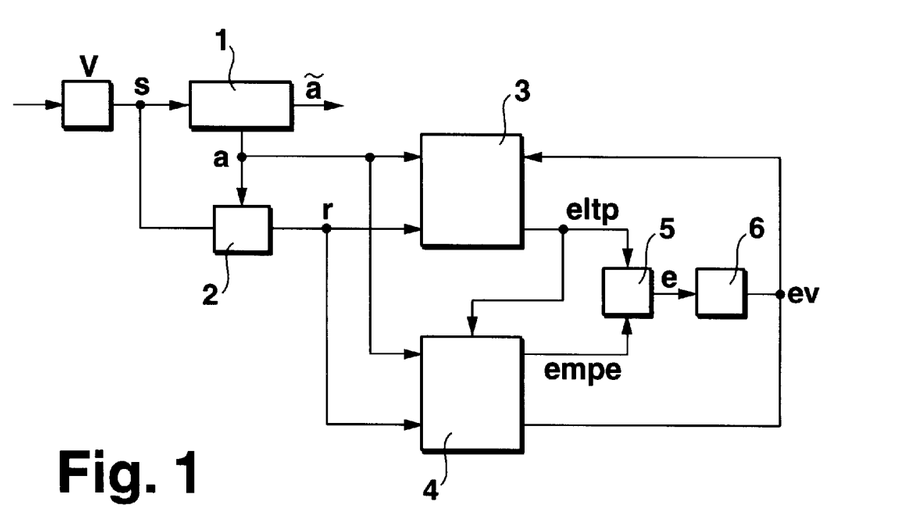
FIG. 1 shows a circuit block diagram of an embodiment of a voice signal encoder for a digital dictation device.

FIG. 1 shows a block diagram of an embodiment of a voice signal encoder for a digital dictating device. The input of the device shown has a digital voice signal from which the digital voice signal s, to be processed in blocks, is generated in a pre-processing circuit V. It is applied to an LPC analyzer 1 and an inversion filter 2.

In the LPC analyzer 1, LPC parameters a are determined from the digitized voice signal s and passed on to the inversion filter 2, an LTP analyzer 3 (LTP=long-term prediction) and to a pulse parameter generating circuit 4. The LTP analyzer 3 and the pulse parameter generating circuit 4 are also supplied with the LPC residual signal r available at the output of the inversion filter 2.

The LTP analyzer 3 determines, from the LPC parameters a, the LPC residual signal r and $e_v$, the total excitation signal e delayed by a subblock, and an excitation vector $e_{ltp}$ which is applied to an input of an adder 5. The other input of the adder 5 is supplied with an excitation vector $e_{mpe}$ generated in the pulse parameter generating circuit 4 which is also determined from the LPC parameters a, the LPC residual signal r and the delayed total excitation signal $e_v$. The delayed total excitation signal $e_v$ is thereby gained by adding the excitation vector elt, and the excitation vector $e_{mpe}$ in the adder 5 with subsequent delay, by the duration of a subblock, in the delay member 6.

The signal supplied to the input of the pre-processing circuit V is a digitized voice signal with a sampling rate of 12 kHz. This signal is supplied, in the pre-processing step, to a high-pass filter with a (lower) limiting frequency of 50 Hz where the D.C. and low-frequency components are eliminated, which might otherwise disturb the subsequent encoding. The transfer function of the high-pass filter is $$H(z) = \frac{z-1}{z-0.99}.$$

The input signal is also pre-emphasized using an FIR filter of first order with a transfer function of $$E(z)=z-0.1$$

This pre-emphasis effects a slight level increase of approximately 1 to 1,5 dB. Finally, formation of blocks is effected in the pre-processing circuit V. This block formation includes segmentation of the signal into mutually overlapping blocks of 324 sampling values each. The duration of each block is 27 ms. The respective overlaps have a duration of 3 ms. Each of the blocks consists of four 6 ms long subblocks, wherein the LTP analysis described further below and the pulse parameter generation is carried out for each subblock, i.e. four times per block. These relations are indicated in the lower part of FIG. 1 wherein AB(n) characterizes an analysis block and SB(n) characterizes a synthesis block. As clearly shown, each analysis block is centered about the associated synthesis block.

Figure 2:
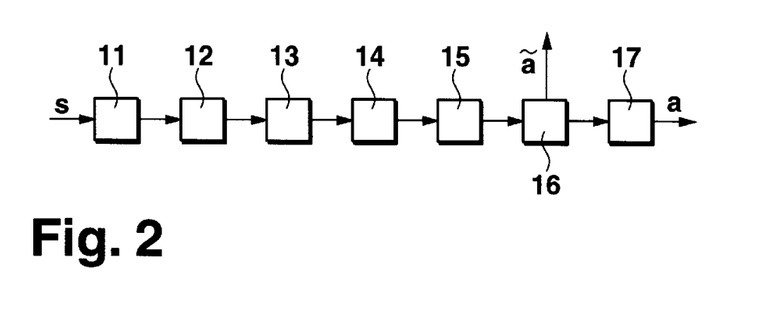
FIG. 2 shows a detailed circuit block diagram of the circuit block of 1 FIG. 1 for description of the LPC analysis.

FIG. 2 shows a detailed block diagram of the circuit 1 of FIG. 1 for explaining the LPC analysis. In the circuit 11, each analysis block is subjected to trapezoidal window formation. The window is defined as follows:

$$w(n) = \begin{cases} \frac{n+1}{14} & 0 \leq n < 14 \\ 1 & 14 \leq n < 310 \\ \frac{324-n}{14} & 310 \leq n < 324 \end{cases}.$$

This type of windowing provides for efficient determination of LPC parameters in connection with signal pre-processing in block V of FIG. 1 and contributes to effective signal compression.

In the next step, calculation of an auto-correlation sequence is effected in circuit block 12 according to the equation $$\varphi_{xx}(n) = \sum_{i=0}^{323-n} s_w(i) \cdot s_w(i+n) \quad (0 \le n \le 14),$$

wherein $s_w(n)$ represents a windowed input segment. The first value $\varphi_{xx}(0)$ of the auto-correlation sequence is subsequently increased by multiplication with a factor of 1.0004 to make the subsequent recursion calculations numerically more favorable.

The LPC prediction parameters are calculated, in circuit 13, from the output signal of the circuit 12 by application of the Durbin-Levinson recursion algorithm to solve the linear system of equations:

$$\begin{bmatrix} \varphi_{xx}(0) & \varphi_{xx}(1) & \cdots & \varphi_{xx}(13) \\ \varphi_{xx}(1) & \varphi_{xx}(0) & \cdots & \varphi_{xx}(12) \\ \cdots & \cdots & \cdots & \cdots \\ \varphi_{xx}(13) & \varphi_{xx}(12) & \cdots & \varphi_{xx}(0) \end{bmatrix} \cdot \begin{bmatrix} a_1'' \\ a_2'' \\ \cdots \\ a_{14}'' \end{bmatrix} = - \begin{bmatrix} \varphi_{xx}(1) \\ \varphi_{xx}(2) \\ \cdots \\ \varphi_{xx}(14) \end{bmatrix}$$

and by setting $a_0''=1$.

These LPC prediction parameters are subjected, in circuit 14, to bandwidth broadening by 20 Hz, wherein the relation $$a_i' = a_i'' \gamma_{bwe}{}^i (0 \le i \le 14)$$

is applied to the LPC parameters and wherein $$\gamma_{bwe} = e^{-\pi \frac{20\,\text{Hz}}{12000\,\text{Hz}}}$$

This bandwidth broadening broadens the formants such that the reproduced decoded voice signal sounds softer and more pleasant.

In the following step in circuit 15, the modified LPC prediction parameters are converted into reflection coefficients. This is effected according to the following equation:

$$k_{14}' = a_{14}'^{(14)}$$

$$\text{form} = 14, \ldots, 2: \quad a_i'^{(m-1)} = \frac{a_i'^{(m)} + k_m' a_{m-i}'^{(m)}}{1 - k_m'^2} (1 \le i \le m-1),$$

$$k_{m-1}' = a_{m-1}'^{(m-1)}$$

The reflection coefficients are then fed to a quantizer 16, where they are quantized using 14 scalar quantizers with a total of 52 bits. The coefficients $k_0'$ to $k_{13}'$ are quantized with 5,5,4,4,4,4,4,3,3,3,3,3,3 and 3 bits, respectively. Quantization is effected using stored tables containing values for the reflection coefficients. Quantizing is effected by simple minimization of the Euclidean distance. This quantization leads to a set of 14 quantized reflection coefficients $k_i$ with $0 \le i \le 13$.

After quantization, the LPC parameters a are calculated in the circuit 17 using the following recursion formulae:

$$a_0^{(l)} = 1 \quad (0 \le l \le 14);$$

$$\text{form} = 1, \ldots, 14: \quad a_i^{(m)} + k_m a_{m-i}^{(m-1)} \quad (1 \le i \le m-1),$$

$$a_m^{(m)} = k_m$$

These LPC parameters a are, in FIG. 1, available at the output of circuit 1 and—as explained above—fed to the circuits 2, 3 and 4. Moreover, quantizer 16 outputs coefficients ã each corresponding to an address in the reflection coefficient memory. These memory addresses ã are recorded, together with the other encoded values, in the dictating device storage medium and are used at the reproduction side in the voice decoder for regenerating the voice signal. A total of 14 LPC parameters a or 14 addresses ã are thereby determined per block.

Signal processing, carried out in circuits 14, 15 and 16, causes a relatively low-loss quantization of the LPC information, leading to a very realistic reproduction of the voice signal.

Figure 3:
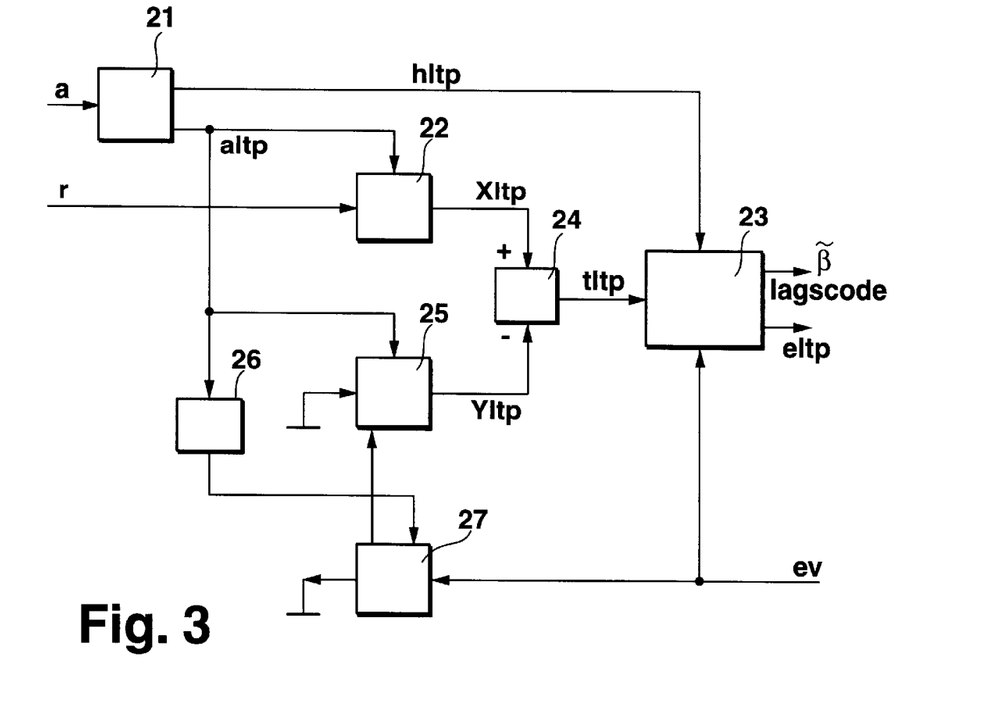
FIG. 3 shows a detailed circuit block diagram of the circuit block 3 of FIG. 1 to describe the LTP analysis.

FIG. 3 shows a detailed block diagram of circuit 3 in FIG. 1 for explaining the LTP analysis.

In addition to the LPC parameters a, the LTP analyzer is supplied with the LPC residual signal r(n) and the delayed total excitation signal $e_v(n)$ with $0 \le n \le 71$. Each LPC residual signal r(n) is associated with a subblock and is determined by inverse LPC filtration of the digital voice signal s present in the circuit block 2, shown at the output of the pre-processing circuit V in FIG. 1, with the function $$A(z) = \sum_{i=0}^{14} a_i \cdot z^{-i}$$

Towards this end, the LPC parameters a determined within the scope of the LPC analysis are also passed to the inversion filter 2.

The LPC parameters are weighted in a weighting circuit 21 with the weighting factor $\gamma_{ltp}=0.7$:

$$a_i^{(ltp)} = a_i \gamma_{ltp}{}^i (0 \le i \le 14)$$

The LPC parameters weighted in this fashion are used to calculate the first 36 sampled values of the pulse response $$h^{(ltp)}(n) \quad (0 \le n \le 35)$$

of the filter $$\frac{1}{\sum_{i=0}^{14} a_i^{(ltp)} z^{-i}} = \frac{1}{A\left(\dfrac{z}{\gamma_{ltp}}\right)}$$

which are supplied to the circuit block 23. Therein, calculation of the weighted LPC parameters $a_i^{(ltp)}$ and of the pulse response $h_{(ltp)}(n)$ is carried out once per block, whereas the further calculations are carried out for each individual subblock.

The LPC residual signal r(n) and the weighted LPC parameters are supplied to the filter 22 having the transfer function $$\frac{1}{A\left(\dfrac{z}{\gamma_{ltp}}\right)}$$

to determine a weighted input signal $$x_{ltp}(n) \quad (0 \le n \le 71)$$

The target vector for a search in the adaptive code book in the circuit block 23

$$t_{ltp}(n) \ (0 \le n \le 71)$$

is obtained by subtraction of a signal $$y_{ltp}(n) \ (0 \le n \le 71)$$

from the signal $x_{ltp}(n)$ in a superimposition circuit 24. The signal $y_{ltp}(n)$ is available at the output of a filter 25 having the transfer function $$\frac{1}{A\left(\frac{z}{\gamma_{ltp}}\right)}$$

to which a zero signal and the weighted LPC parameters $a_{ltp}$ from the circuit 21 are supplied. Before filtering, the status memories of this filter 25 are updated with the status memory contents of the filter in circuit 27:

$$\frac{1}{A\left(\frac{z}{\gamma_{ltp}}\right)},$$

to which the delayed total excitation $e_v$ is input and which is defined by the weighted LPC parameters $a_{ltp}$, also delayed by the duration of a subblock in the delay circuit 26.

Each search in the adaptive code book carried out in circuit 23 uses 72 sampling values, which are derived from the last 186 total excitation signal sampling values $e(n)$ with $-186 \le n \le -1$ according to the following scheme:

$$c_m(n) = e(-\lambda m + n) \ (0 \le n \le 71)$$

wherein:

$$36 \le m_{\min} \le m \le m_{\max} \le 186, \lambda = \begin{cases} 1 & \text{if } m > n \\ 2 & \text{if } m \le n \end{cases}.$$

The search in the adaptive code book considers only integral delays m. The search in the adaptive code book is carried out over the entire range of 151 delays in only the first subblock of each block. In further subblocks of each block, only a limited range of 48 delays is searched. This range depends on the delay determined in the previous subblock and is fixed by the following equation:

$$m_{\min} = \begin{cases} 36 & \text{in-subblock-1} \\ \text{MAX}(59, M_{prev}) - 23 & \text{in-subblock 2, 3, and 4} \end{cases},$$

$$m_{\max} = \begin{cases} 186 & \text{in-subblock-1} \\ \text{MIN}(162, M_{prev}) + 24 & \text{in-subblock 2, 3, and 4} \end{cases}.$$

wherein $M_{prev}$ is the delay resulting from the LTP analysis of the respective preceding subblock.

Selection of the best delay M is effected by determination of $$C_M = \underset{m_{\min} \le m \le m_{\max}}{\text{MAX}} \left( C_m = \frac{\text{cross}(m)}{\sqrt{\text{energy}(m)}} \right).$$

wherein:

$$\text{cross}(m) = \sum_{n=0}^{71} t_{lpc}(n) \cdot f_m(n) \text{ and } \text{energy}(m) = \sum_{n=0}^{71} f_m(n)^2,$$

$f_m(n)$ is the response of the FIR filter which is defined by the pulse response $h^{(ltP)}(n)$ to the code word $c_m(n)$, assuming that the status memories of this filter are deleted.

After determination of the optimum delay M, the associated optimum amplification factor is calculated according to the equation $$\beta' = \frac{\text{cross}(M)}{\text{energy}(M)}.$$

This amplification factor is subsequently quantized with a 5 bit linear quantizer e.g. using a stored table. The resulting quantized amplification factor $\Box$ is used for calculation of the component of the excitation vector, obtained from the adaptive code book, for the present subblock according to the following equation:

$$e_{ltp}(n) = \beta \cdot c_M(n) \ (0 \le n \le 71)$$

The delays obtained in the four subblocks are encoded using a total of 24 bits: Assuming that $M_s$ gives the delay of the subblock s ($1 \le s \le 4$), the 24 bit delay code is calculated according to the following equation:

$$lagscode = \{\{(M_4 - m_{min}(4))48 + (M_3 - m_{min}(3))\}48 + (M_2 - m_{min}(2))\}151 + (M_1 - 36)$$

wherein $m_{min}(s)$ is the lower limit of the search range for the delay in the subblock s.

According to the method described, a signal $e_{ltp}(n)$ is determined within the scope of the LPT analysis, in the circuit 3 of FIG. 1, for each subblock. This signal represents the component of the excitation vector for the present subblock obtained from the adaptive code book. Moreover, in the circuit 23 (see FIG. 3) a delay code lagscode is determined for each block as well as 4 quantizing indices β for the amplification factors which each correspond to an address in an associated table memory where values for the amplification factors $\Box$ are stored. These coefficients lagscode and β are recorded, together with the further encoded values, on the storage medium of the dictating device, in particular on a non-permanent flash memory or battery-buffered RAM and used on the reproduction side in the voice decoder for regenerating the voice signal.

Figure 4:
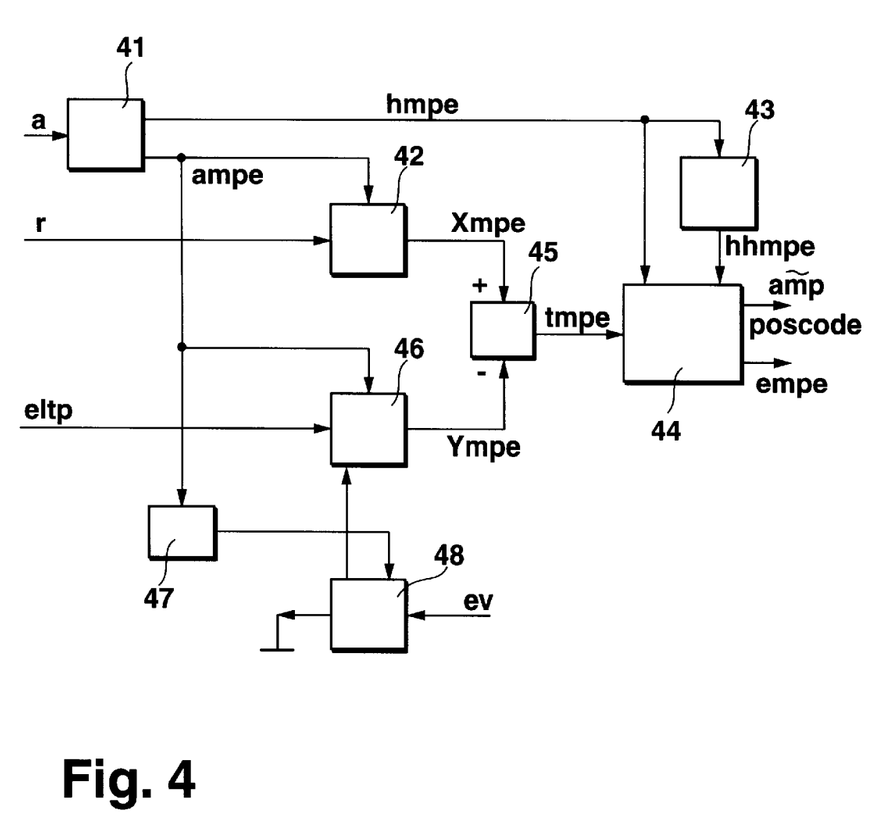
FIG. 4 shows a detailed circuit block diagram of the circuit block 4 of FIG. 1 to describe generation of pulse parameters

FIG. 4 shows a detailed block diagram of circuit 4 in FIG. 1 for explaining pulse parameter generation.

The pulse parameter generating circuit is supplied, in addition to the LPC parameters a determined in the LPC analyzer, with the LPC residual signal $r(n)$, the delayed total excitation signal $e_v$ as well as the excitation signal component $e_{ltp}$ determined in the LTP analysis.

The LPC parameters are weighted in a weighting circuit 41 with a weighting factor $\gamma_{mpe}=0.9$:

$$a_i^{(mpe)} = a_i \cdot \gamma_{mpe}^i \quad (0 \leq i \leq 14)$$

The LPC parameters weighted in this fashion are used to calculate the first 42 sampling values of the pulse response $$h^{(mpe)}(n) \quad (0 \leq n \leq 41)$$

of the filter $$\frac{1}{\sum_{i=0}^{14} a_i^{(mpe)} z^{-i}} = \frac{1}{A\left(\frac{z}{\gamma_{mpe}}\right)}$$

which are supplied to the circuit 44. In this case, as in the LTP analysis, calculation of the weighted LPC parameters $a_i^{(mpe)}$ and of the pulse response $h^{(mpe)}(n)$ is effected once per block. In addition, an auto-correlation sequence is determined from the pulse response $h^{(mpe)}(n)$ in the circuit 43 according to the following equation:

$$hh^{(mpe)}(n) = \begin{cases} \sum_{i=0}^{42-n} h^{(mpe)}(i) \cdot h^{(mpe)}(i+n) & 0 \leq n < 42 \\ 0 & 42 \leq n < 72 \end{cases}$$

This sequence is also supplied to the circuit 44. The further calculations are carried out individually for each subblock.

Calculation of a target vector $$t_{mpe}(n) = x_{mpe}(n) - y_{mpe}(n) \quad (0 < n \leq 71),$$

available at the output of the superimposition circuit 45 is carried out, in principle, using the same calculation scheme as for the calculation of the target vector $t_{ltp}$ in the LTP analysis. In this case as well, a weighted version $x_{mpe}(n)$ of the input signal is generated by filtration of the LPC residual signal in a filter 42 with the transfer function $$\frac{1}{A\left(\frac{z}{\gamma_{mpe}}\right)}$$

Moreover, a signal $y_{mpe}(n)$ is obtained by filtration, not of a zero signal, but of the excitation signal component from the adaptive code book $e_{ltp}$ in a filter 46

$$\frac{1}{A\left(\frac{z}{\gamma_{mpe}}\right)}$$

the status memories of which are updated before each subblock filtration, with the status memory contents of the filter $$\frac{1}{A\left(\frac{z}{\gamma_{mpe}}\right)},$$

realized in circuit 48 to which the delayed total excitation $e_v$ is applied and which is defined by the weighted LPC parameters $a_{mpe}$ which are also delayed by the duration of a subblock in the delay circuit 47.

In circuit 44 of FIG. 4, pulse parameters, specifying those 7 positions in the respective subblock where the excitation pulses must be present and also comprising information concerning the pulse amplitudes, are determined using the pulse response $h^{(mpe)}(n)$, the auto-correlation sequence $hh^{(mpe)}(n)$ and the target vector $t_{mpe}(n)$.

Towards this end, a vector $th(n)$ is initially determined according to the following equation:

$$th(n) = \sum_{i=n}^{\text{MIN}(71,n+42)} t_{mpe}(i+n) \cdot h^{(mpe)}(i) \quad (0 \leq n \leq 17).$$

The first pulse position is then given by $$p_1 = N \text{ with } |th(N)| = \underset{0 \leq n \leq 71}{\text{MAX}}(|th(n)|).$$

The defined th value is then stored in $$d_0 = th(N),$$

the first element of a vector variable of length 7.

The second pulse position is determined as follows:

$$m_{n,0} = \frac{hh^{(mpe)}(|n-N|)}{hh^{(mpe)}(0)} \quad (0 \leq n \leq 71)$$

$$th(n) = th(n) - m_{n,0} \cdot d_0 \quad (0 \leq n \leq 71)$$

$$p_2 = N \text{ with } |th(N)| = \underset{n \in \left\{\begin{array}{l}\{0,\ldots,p_1-1\} \cup \\ \{p_1+1,\ldots,71\}\end{array}\right\}}{\text{MAX}}(|th(n)|)$$

$$d_1 = th(N)$$

wherein $m_{\mu,\nu}$ is a 72×6 matrix variable.

The five remaining pulse positions are determined in a loop as follows:

$$j = 1$$

as-long-as $j < 6$:

$$m_{n,j} = \frac{hh^{(mpe)}(|n-N|)}{hh^{(mpe)}(0)} - \sum_{i=0}^{j-1} m_{n,i} \cdot m_{N,i} \quad (0 \leq n \leq 71)$$

$$th(n) = th(n) = m_{n,j} \cdot d_j$$

$$p_{j+2} = N \text{ with } |th(N)| = \underset{n \in \left\{n \middle| \begin{array}{l} 0 \leq n \leq 71 \wedge \\ n \neq p_1,\ldots,p_{j+1}\end{array}\right\}}{\text{MAX}}(|th(n)|)$$

$$d_{j+1} = th(N)$$

$$j = j + 1.$$

When all seven pulse positions have been determined in the manner described, the associated pulse amplitudes $b_j (1 \leq j \leq 7)$ are obtained through application of the following recursion relation:

$$b_7 = \frac{d_6}{hh^{(mpe)}(0)}$$

$$j = 5$$

as-long-as $j \geq 0$:

$$b_{j+1} = \frac{d_j}{hh^{(mpe)}(0)} - \sum_{i=j+1}^{6} m_{p_i,j} \cdot b_{i+1}$$

$$j = j + 1.$$

The 7 parameter pairs $[p_j, b_j]$ determined in this fashion, having the pulse position and pulse amplitude, respectively, are newly sorted such that the values for the pulse positions of the finally obtained pulse parameter pairs $[pos_j, amp_j']$ are present in descending sequence, i.e.

$$72 > pos_1 > pos_2 > pos_3 > pos_4 > pos_5 > pos_6 > pos_7 > 0$$

This sorting is required for the subsequent position encoding leading to a position code with 31 bits calculated as a sum of binominal coefficients:

$$poscode = \sum_{i=1}^{7} \binom{pos_i}{8-i}.$$

The pulse amplitudes amp' are quantized as follows. The block maximum, the maximum magnitude of the 7 pulse amplitudes, is quantized in a non-linear manner e.g. using a stored table with 6 bits, and the pulse amplitudes are then normalized to the quantized block maximum and subsequently subjected to a 3 bit linear quantization, e.g. using an additional table.

The resulting denormalized quantized pulse amplitudes amp are finally used for forming a pulse parameter vector according to the following relation:

$$e_{mpe}(n) = \begin{cases} amp_j & n = pos_j \\ 0 & \text{otherwise} \end{cases} (0 \leq n \leq 71).$$

A signal $e_{mpe}(n)$ is then detected within the framework of the pulse parameter generation in the circuit block 4 in FIG. 1—an excitation vector, formed by the pulse parameters for the current subblock. Furthermore, the position code poscode and coefficients amp are generated in circuit 44 (see FIG. 4), are derived from amplitude quantization, and consist of 8 indices, since the block maximum is quantized in addition to the 7 amplitudes. These coefficients are recorded together with the further encoded values and are used on the reproduction side in the voice decoder for regenerating the voice signal. Determination of these pulse parameter coefficients poscode and amp is carried out four times per block, i.e. once per subblock.

Figure 5:
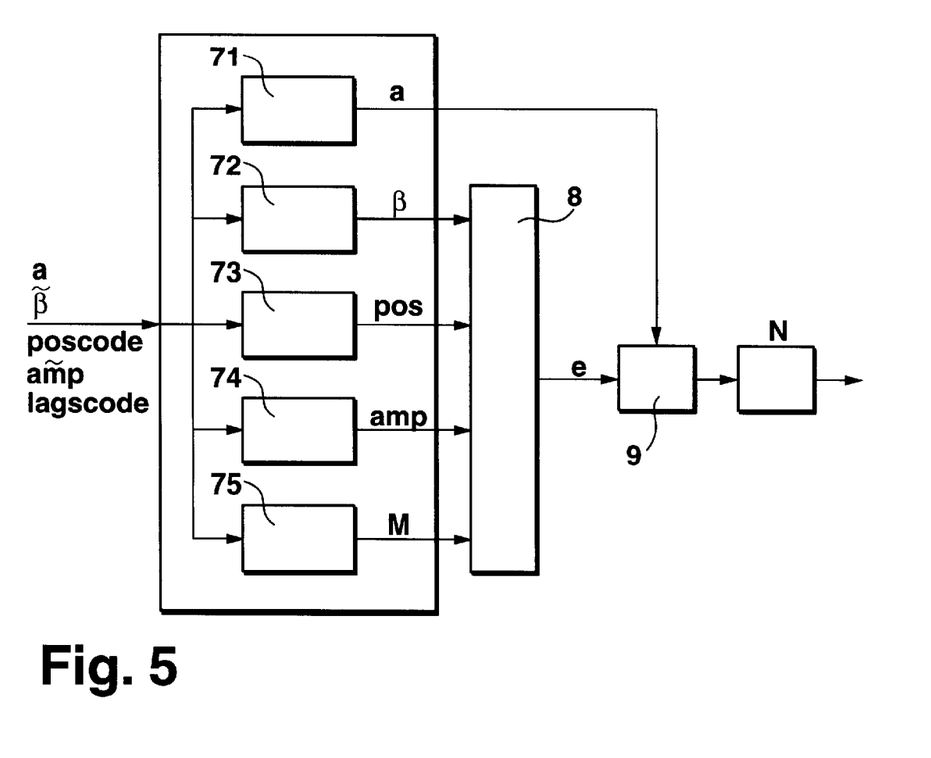
FIG. 5 shows a circuit block diagram of an embodiment of a voice signal decoder for a digital dictation device.

FIG. 5 shows a block diagram of an embodiment of a voice signal decoder for a digital dictating device. This voice signal decoder is of simple construction and comprises a parameter decoder 7, an excitation signal determination circuit 8, a synthesis filter 9 and a post-processing circuit N.

The input of the parameter decoder 7 is fed with a multiplex signal which contains the transferred or recorded encoded values ã, lagscode, β, poscode and amp. Determination of 14 LPC parameters a for each block is carried out in the parameter decoder 7 using the coefficients ã and an associated table memory 71. Moreover, to the additional parameters M, β, pos and amp are regenerated for each subblock, wherein the amplification value β, encoded with 5 bits, is determined e.g. by means of a table memory 72. The 7 pulse positions $pos_j(1 \leq j \leq 7)$ of a subblock are obtained from the 31 bit long position code poscode in the calculation circuit 73 through application of the following calculation scheme:

$$code = poscode$$

$$n = 71$$

$$j = 7$$

as – long – as $j > 0$:

as – long – as $code < \binom{n}{j}: n = n - 1$ $$pos_{8-j} = n$$

$$code = code - \binom{n}{j}$$

$$j = j - 1.$$

The pulse amplitudes $amp_j(1 \leq j \leq 7)$ are obtained from the amp via a circuit 74 by first decoding the 6 bit encoded block maximum, e.g. using the associated quantizing table, and the seven normalized amplitudes are then decoded. Finally, each of the decoded pulse amplitudes amp is determined as a product of the decoded block maximum and of the decoded normalized amplitude.

Finally, in circuit 75, the 4 LTP delays $M_1$ to $M_4$ are determined from the 24 bit value lagscode as follows:

$$code = lagscode$$

$$aux = \left\lfloor \frac{code}{151} \right\rfloor$$

$$M_1 = (code - 151 \cdot aux) + 36$$

$$s = 2$$

as – long – as $s \leq 4$:

$$code = aux$$

$$aux = \left\lfloor \frac{code}{48} \right\rfloor$$

$$M_s = (code - 48 \cdot aux) + m_{\min}(s).$$

wherein $m_{min}(s)$ is the lower limit of the search range for the delay in each of the subblocks and $\lfloor x \rfloor$ characterizes the largest integer which does not exceed x.

The values for M, β, pos and amp, determined for each subblock are used to calculate an excitation signal in the next step, in circuit 8. This calculation is carried out for each of the subblocks, i.e. four times per block.

The component obtained from the adaptive code book is initially calculated as follows:

$$e_{hp}(n) = \beta \cdot c_M(n) \quad (0 \leq n \leq 71)$$

wherein $c_M(n)$ is the entry in the adaptive code book associated with the delay M.

A pulse excitation vector $$e_{mpe}(n) = \begin{cases} amp_j & n = pos_j \ (1 \le j \le 7) \\ 0 & \text{otherwise} \end{cases} \quad (0 \le n \le 71)$$

is then determined such that the excitation signal e(n) is given by $$e(n) = e_{ltp}(n) + e_{mpe}(n) \quad (0 \le n \le 71)$$

The output voice signal is obtained from the LPC synthesis filter 9

$$\frac{1}{A(z)} = \frac{1}{\sum_{i=0}^{14} a_i z^{-i}}$$

defined by the LPC parameters a, which is fed with the total excitation signal e(n).

Finally, a de-emphasis is carried out in the post-processing circuit N, i.e. a lowering of the recording-side raised higher frequencies of the voice signal, using a filter having the transfer function:

$$D(z) = \frac{z}{z - 0.1}.$$

Moreover, in this circuit, post-filtration, in particular adaptive post-filtration, of the voice signal can be carried out for influencing the quality of the resulting voice signal.

According to an advantageous further development of the invention, the bit rate of the above-described system is variable such that the effective bit rate can be reduced, in particular for low ambient noise levels. This further development comprises a voice detector which monitors the input signal for the occurrence of speech pauses. The signal present during these speech pauses may be transmitted or stored with low quality such that the signal can be encoded for the duration of the speech pauses with a considerably lower bit rate than for speech. Implementation of this voice detector, with which the voice signal encoder of FIG. 1 must be supplemented requires evaluation of the energy of the digital voice signal s. The input signal power for the respective synthesis block is given by $$P = \frac{1}{288} \sum_{n=0}^{287} s(n)^2$$

This power value is compared to an adaptive threshold value Thr which is determined as follows.

An estimated value $P_n$ for the noise power is increased block by block according to the relation $$P_n = 1.015625 P_n$$

as long as it is not larger than the signal energy P of the present block. If this condition is no longer met, this estimated value is reset to $$P_n = P.$$

Following this update of $P_n$ a result possibly outside of the range $$2^7 \le P_n \le 2^{18}$$

is set to the upper or lower exceeded limit.

The estimated value for the noise power should be initialized at $$P_n = 128$$

to prevent low level voice signals from being interpreted as a speech pause during initiation of the threshold value phase. To keep the threshold value initiation phase short, the minimum output $P_{min}$ of the input signal which occurs during processing of the first 50 blocks is determined. After these first 50 blocks, the estimated value for the noise power is increased, if $P_{min}$ exceeds $P_n$, as long as no speech pause is determined, according to the following relation $$P_n = 1.046875 P_n$$

On the basis of this estimated value for the noise power, a decision threshold value is calculated as follows:

$$Thr = -2^{-17} P_n^2 + 5 P_n$$

A preliminary decision is then made for the current block as to whether a speech i0 pause occurred:

$SA_0 = 1$ for $P \ge Thr$
$SA_0 = 0$ for $P < Thr$.

The final decision concerning whether or not a speech pause occurred is made according to the relation $$SA = SA_{-5} \vee SA_{-4} \vee SA_{-3} \vee SA_{-2} \vee SA_{-1} \vee SA_0.$$

This means that the present block is only classified as a block without voice signal if the determined signal output from the current and from the last 5 blocks is below the threshold value.

Blocks without voice signals are modeled as spectral colored noise. In addition to a speech activity bit, which is zero in this case, the LPC coefficients and an amplification factor are also stored, per subblock, for these blocks. LPC analysis and encoding/decoding of the reflection coefficients is carried out as for the voice signals. One less bit is used for quantizing the 14th reflection coefficient.

Figure 6:
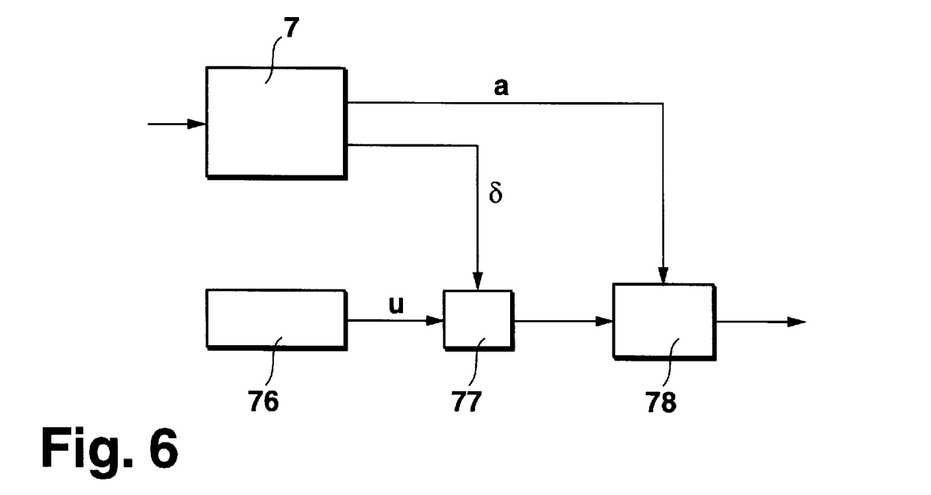
FIG. 6 shows a circuit block diagram of a decoder for blocks without voice signals.

The decoder architecture for blocks without voice signal is shown in FIG. 6. A noise generator 76 is used to determine the excitation signal, in addition to the parameter decoder 7, a multiplier 77 and a synthesis filter 78 and provides evenly distributed random numbers u(n) in an amplitude range between −1 and 1.

The encoder determines one amplification factor □ per subblock by adjusting the excitation signal energy to a level which is 3 dB below the energy level of the LPC residual signal. For the simultaneous 5 bit quantization of the amplification factor, the expression $$\left| \frac{\delta^2}{3} - \frac{1}{144} \sum_{n=0}^{71} r(n)^2 \right|$$

is minimized over the entire supply of non-linear quantized noise amplification factors □ using a stored table. The total bit rate for the duration of the blocks without voice signal is then $$\frac{(1 + 51 + 20)\text{Bits}}{24\,\text{ms}} = 3.0\,\text{kbps}.$$

Encoding and decoding of the blocks with voice signal is carried out essentially as described above in connection with FIGS. 1–5 except for the following differences:

Storage of a voice activity bit for each block is possible without changing the bit rate by encoding the 14th reflection coefficient with one less bit than in the above-described embodiment with fixed bit rate.

The adaptive code book for the voice signal encoder and in the voice signal decoder must only comprise excitation vectors derived from blocks with voice signal. This means that the noise production used for encoding blocks without voice signal is not integrated in the adaptive code book, i.e. the adaptive code book is deactivated or frozen for blocks without voice signal.

Moreover, within the framework of the encoder-sided calculations, the filter memories of the weighting filters and synthesis filters have to be reset for each transition between blocks without voice signal to blocks with voice signal.

LIST OF REFERENCE SYMBOLS 1 voice signal analyzer
11 circuit for weighting an input signal block
12 circuit for calculating an autocorrelation sequence
13 circuit for calculating prediction parameters
14 circuit for bandwidth widening
15 circuit for determining reflection colfficients
16 quantizer
17 circuit for calculating prediction parameters
2 inverse filter
21 weighting circuit
22 synthesis filter
23 circuit
24 overlap circuit
25 synthesis filter
26 circuit
27 synthesis filter
3 circuit for determining an excitation signal component
4 circuit for determining a mulipulse component
41 weighting circuit
42 synthesis filter
43 circuit for calculating an autocorrelation sequence
43 circuit
45 overlap circuit
46 synthesis filter
46 circuit
48 synthesis filter
5 adder
6 delay member
7 parameter decoder
71 table memory
72 table memory
73 calculation circuit
74 circuit
75 circuit
76 noise generator
77 multiplier
78 synthesis filter
8 circuit for determining an excitation signal
9 synthesis filter
ã coefficients
a LPC parameters
AB(n) analysis block
$a_{ltp}$ delayed, weighted prediction parameters
amp prediction parameters
$a_{mpe}$ weighted prediction parameters
e overall excitation signal
$e_{ltp}$ excitation signal components
$e_{ltp}$ excitation vector
$e_{mpe}$ excitation vector
$e_v$ delayed overall excitation signal
$hh_{mpe}$ autocorrelation sequence
$h_{ltp}$ pulse response
$h_{mpe}$ pulse response
r LPC residual signal
s voice signal
SB(n) synthesis block
$t_{ltp}$ target vector
$t_{mpe}$ target vector
v pre-processing stage
$x_{ltp}$ weighted input signal
$x_{mpe}$ output signal
$y_{ltp}$ signal
$y_{mpe}$ output signal

What is claimed is:

1. A method of encoding and decoding voice signals, the method comprising the steps of:

a) analyzing a digital voice signal for determination of prediction parameters, b) determining an excitation signal component from an adaptive code book, the adaptive code book being formed from a delayed total excitation signal, said adaptive code book being used for LTP analysis and being constructed from entries resulting from said delayed total excitation signal which are completely searched in a first subblock of each block, whereas, in each of additional subblocks, only a defined partial range is searched, the partial range being determined by a respective preceding delay;

c) minimizing an output of a weighted, filtered deviation of a signal resulting from a respective evaluated excitation signal from an input voice signal to determine a multiple pulse component of said excitation signal;

d) processing digital voice signals in sequential overlapping blocks having a constant number of sampling values, each of which is divided into a defined number of subblocks having a defined number of sampling values, for determination of the excitation signal parameters;

e) scalar quantizing reflection coefficients resulting from a block per block analysis of said voice signal for determination of prediction parameters using individually adjusted quantization tables;

f) encoding delayed values for all subblocks together in a delay code and linearly quantizing each individual associated amplification factor;

g) encoding pulse positions of a subblock together in a position code and subjecting associated amplitudes to a block-adaptive linear quantization, wherein an amplitude value maximum is quantized non-linearly and each of normalized pulse amplitudes are linearly quantized, wherein each multiple pulse excitation vector determined for one subblock contains, in addition to a defined number of pulses, only zero sampling values;

h) decoding parameters for reclaiming quantized transfer values using table memories for regenerating quantized reflection coefficients;

i) generating an excitation signal using a regenerated component from said adaptive code book and a regenerated multiple pulse component, wherein a regenerated voice signal is constructed by synthesis filtration using said excitation signal and regenerated prediction parameters;

j) calculating, during parameter decoding, delays for components obtained from said adaptive code book from a delay code, wherein a delay for a first subblock of a block lies in a range of sampling periods and delays for three additional subblocks lie in ranges defined by a respective preceding delay;

k) determining, during parameter decoding, linearly quantized amplification factors for components of said excitation signal obtained from one of said adaptive code book and a table;

l) calculating, during parameter decoding, corresponding pulse positions for a multiple pulse component of said excitation vector of a subblock, wherein position values of said subblock are each extracted from a position code; and m) determining, during parameter decoding, pulse amplitudes for a multiple component of said excitation signal of a subblock, wherein each non-linearly quantized block maximum and each linearly quantized normalized pulse amplitude is extracted for multiplicative regeneration of respective quantized unnormalized pulse amplitudes of said subblock.

2. The method of claim 1, wherein a sampling frequency between 11 and 13 kilohertz is utilized for sampling said digital voice signals and a number of sampling values of a block is set as a multiple of a number of subblocks.

3. The method of claim 2, wherein a number of sampling values is fixed at 288 and a number of subblocks is set to four such that a number of sampling values per subblock is set to 72.

4. The method of claim 1, wherein a number of reflection coefficients is set to 14 and 5, 5, 4, 4, 4, 4, 4, 4, 3, 3, 3, 3, 3, and one of 3 or 2 bits respectively are used for quantization thereof.

5. The method of claim 1, wherein step b) comprises the step of utilizing total excitation signal values, delayed by between 36 and 186 sampling periods, for generating said adaptive code book, wherein, after a second subblock, each subregion which is to be searched is set to 48 delay values, and a delay code is set to a length of 24 bits and linear quantization of an amplification factor is effected using 5 bits.

6. The method of method of claim 1, further comprising the step of prefiltering said voice signal prior to step a) to suppress low-frequency components and to slightly emphasize high-frequency components.

7. The method of claim 1, wherein prediction parameters are determined through analysis of said voice signal in defined time regions which respectively extend blocks by a defined amount of time into a past and into a future such that drifts in said voice signal are included in results of said analysis in view of overlap between neighboring analyzing sections.

8. The method of claim 7, wherein a defined length of an analysis region is 27 ms and said region is centered with respect to blocks to be processed.

9. The method of claim 1, wherein analysis sections are subjected to a trapezoidal windowing having a window side length of 14 sample values prior to performing an LPC analysis of $14^{th}$ order in accordance with an autocorrelation method with stabilization and prefiltering is carried out using a limiting frequency of 50 Hz with the scalar quantization of reflection coefficients being effected through a simple minimization of a Euclidean distance between unquantized values and the entries of a respective individually adjusted representation table, wherein resulting LPC parameters are subjected to a weighting using a factor of 0.7 for carrying out LTP analysis to determine an excitation signal component from said adaptive code book, wherein a power of a weighted and filtered deviation between a respective signal resulting from a respective code book entry and said input voice signal is minimized and LPC parameters derived from prediction parameter determination are weighted using a factor of 0.9 for determination of a multiple pulse component of said excitation signal.

10. The method of claim 1, wherein voice signal encoding and decoding is carried out using a variable bit rate and said input signal is monitored for occurrence of speech pauses and speech pauses are recognized, wherein a signal power of said input signal is evaluated for monitoring of said speech pauses, with speech monitoring entailing a comparison between a signal power of said input signal and an adaptive threshold value, wherein evaluation of said signal power of said input signal is carried out in blocks and a speech pause is detected if a determined signal power lies below a threshold value throughout a plurality of sequential blocks, wherein a speech recognition bit is stored for characterizing a presence of said speech pause, and when blocks occur having no voice signals, input sided production of an excitation vector is carried out using a noise generator.

11. A device for encoding and decoding voice signals, comprising:

means for analyzing a digital voice signal for determination of prediction parameters;

means for determining an excitation signal component from an adaptive code book, the adaptive code book being formed from a delayed total excitation signal, said adaptive code book being used for LTP analysis and being constructed from entries resulting from said delayed total excitation signal which are completely searched in a first subblock of each block, whereas, in each of additional subblocks, only a defined partial range is searched, the partial range being determined by a respective preceding delay;

means for minimizing an output of a weighted, filtered deviation of a signal resulting from a respective evaluated excitation signal from an input voice signal to determine a multiple pulse component of said excitation signal;

means for processing digital voice signals in sequential overlapping blocks having a constant number of sampling values, each of which is divided into a defined number of subblocks having a defined number of sampling values, for determination of the excitation signal parameters;

means for scalar quantizing reflection coefficients resulting from a block per block analysis of said voice signal for determination of prediction parameters using individually adjusted quantization tables;

means for encoding delayed values for all subblocks together in a delay code and linearly quantizing each individual associated amplification factor;

means for encoding pulse positions of a subblock together in a position code and subjecting associated amplitudes to a block-adaptive linear quantization, wherein an amplitude value maximum is quantized non-linearly and each of normalized pulse amplitudes are linearly quantized, wherein each multiple pulse excitation vector determined for one subblock contains, in addition to a defined number of pulses, only zero sampling values;

means for decoding parameters for reclaiming quantized transfer values using table memories for regenerating quantized reflection coefficients;

means for generating an excitation signal using a regenerated component from said adaptive code book and a regenerated multiple pulse component, wherein a regenerated voice signal is constructed by synthesis filtration using said excitation signal and regenerated prediction parameters;

means for calculating, during parameter decoding, delays for components obtained from said adaptive code book from a delay code, wherein a delay for a first subblock of a block lies in a range of sampling periods and delays for three additional subblocks lie in ranges defined by a respective preceding delay;

means for determining, during parameter decoding, linearly quantized amplification factors for components of said excitation signal obtained from one of said adaptive code book and a table;

means for calculating, during parameter decoding, corresponding pulse positions for a multiple pulse component of said excitation vector of a subblock, wherein position values of said subblock are each extracted from a position code; and means for determining, during parameter decoding, pulse amplitudes for a multiple component of said excitation signal of a subblock, wherein each non- linearly quantized block maximum and each linearly quantized normalized pulse amplitude is extracted for multiplicative regeneration of respective quantized unnormalized pulse amplitudes of said subblock.

12. The device of claim 11, wherein said voice signal encoder comprises:

a pre-processing stage;

a voice signal analyzer for determination of prediction parameters from a digital voice signal;

an inversion filter connected to an output of said voice signal analyzer for determination of a residual signal from a digital voice signal using prediction parameters;

a circuit for determination of an excitation signal component from an adaptive code book, to an input side of which said prediction parameters, a residual signal and a delayed total excitation signal are applied; and a circuit for determination of a multiple pulse component of an excitation vector, to an input side of which said prediction parameters, said residual signal, an excitation signal component from an adaptive code book and said delayed total excitation signal are applied;

wherein said voice signal decoder comprises: a parameter decoder, containing table memories and calculation circuits for reconstructing said prediction parameters and parameters for said excitation signal component from said adaptive code book and said multiple pulse component from one of transmitted and stored values;

a circuit for determination of an excitation signal from a reconstructed component from said adaptive code book and from a reconstructed multiple pulse component; and a synthesis filter to which said excitation signal and reconstructed prediction parameters are applied for forming a reconstructed voice signal.

13. The device of claim 12, wherein said pre-processing stage comprises a high-pass filter.

14. The device of claim 12, wherein said pre-processing circuit comprises a circuit for dividing a signal into signal blocks.

15. The device of claim 12, wherein said voice signal analyzer is an LPC analyzer.

16. The device of claim 12, wherein said voice signal analyzer comprises a circuit for weighting an input signal block using a window.

17. The device of claim 12, wherein said voice signal analyzer comprises a circuit for calculation of an auto-correlation sequence.

18. The device of claim 12, wherein said voice signal analyzer comprises a circuit for calculation of prediction parameters using a Durbin-Levinson recursion algorithm.

19. The device of claim 12, wherein said voice signal analyzer comprises a circuit for broadening a bandwidth.

20. The device of claim 12, wherein said voice signal analyzer comprises a circuit for determination of reflection coefficients.

21. The device of claim 12, wherein reflection coefficients are fed to a quantizer in which scalar quantization of said reflection coefficients is effected by a memory table.

22. The device of claim 12, wherein each signal block comprises several subblocks and said inversion filter determines a residual signal for each subblock.

23. The device of claim 12, wherein said circuit for determination of said excitation signal component from said adaptive code book comprises a first weighting circuit in which said prediction parameters are weighted with a first weighting factor.

24. The device of claim 12, wherein said circuit for determination of said multiple pulse component comprises a second weighting circuit in which said prediction parameters are weighted with a second weighting factor which differs from a first weighting factor.

25. The device of claim 12, wherein said voice signal encoder and said voice signal decoder work at a variable bit rate.

26. The device of claim 25, further comprising a speech pause detector which monitors said input signal for occurrence of speech pauses.

27. The device of claim 26, wherein said speech pause detector evaluates a signal power of said input signal.

* * * * *